(12) United States Patent
Kim (10) Patent No.: US 12,072,801 B2
(45) Date of Patent: Aug. 27, 2024

(54) STORAGE DEVICE AND METHOD FOR RESTORING META DATA THEREOF

(71) Applicant: SAMSUNG ELECTRONICS CO., LTD., Suwon-si (KR)

(72) Inventor: Tae-Hwan Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 18 days.

(21) Appl. No.: 17/973,184

(22) Filed: Oct. 25, 2022

(65) Prior Publication Data

US 2023/0146696 A1     May 11, 2023

(30) Foreign Application Priority Data

Nov. 11, 2021 (KR) .................. 10-2021-0155156
May 26, 2022 (KR) .................. 10-2022-0064426

(51) Int. Cl.
*G06F 12/0802* (2016.01)
*G06F 12/0871* (2016.01)

(52) U.S. Cl.
CPC ...... *G06F 12/0802* (2013.01); *G06F 12/0871* (2013.01); *G06F 2212/60* (2013.01)

(58) Field of Classification Search
CPC ............ G06F 12/0802; G06F 2212/60; G06F 12/0871; G06F 12/0888; G06F 2212/1024; G06F 2212/1032; G06F 2212/214; G06F 2212/312; G06F 2212/7203; G06F 12/0246; G06F 2212/466; G06F 2212/7204; G06F 2212/7207; G06F 3/0614; G06F 3/0631; G06F 3/0656; G06F 3/0658; G06F 3/0679
USPC ................................................ 711/118, 117
See application file for complete search history.

(56) References Cited

U.S. PATENT DOCUMENTS

| | | | |
|---|---|---|---|
| 6,098,153 A * | 8/2000 | Fuld | G06F 12/0862 711/134 |
| 9,852,076 B1 * | 12/2017 | Garg | G06F 16/172 |
| 9,927,985 B2 | 3/2018 | Zhang et al. | |
| 11,016,889 B1 | 5/2021 | Benjamin et al. | |
| 2006/0106891 A1 * | 5/2006 | Mahar | G06F 16/10 707/999.203 |

(Continued)

FOREIGN PATENT DOCUMENTS

| KR | 10-2012-0048073 A | 5/2012 |
|---|---|---|
| KR | 10-2012-0108339 A | 10/2012 |

(Continued)

OTHER PUBLICATIONS

Gijun Oh et al., Implementation of Memory Efficient Flash Translation Layer for Open-Channel SSDS, Feb. 2021, pp. 142-150, vol. 10 No. 1, International Journal of Advanced Smart Convergence, Korea.

*Primary Examiner* — David Yi
*Assistant Examiner* — Zubair Ahmed
(74) *Attorney, Agent, or Firm* — Fish & Richardson P.C.

(57) ABSTRACT

An operating method of a storage device, the method including; loading journal data from a non-volatile memory device, identifying a cache allocation flag included in the journal data, and restoring meta data corresponding to the journal data to a storage controller in response to the cache allocation flag. Here, the cache allocation flag is a first flag when the meta data are allocated to a meta cache of the storage controller, and the cache allocation flag is a second flag when the meta data are stored to a meta buffer of the storage controller.

20 Claims, 10 Drawing Sheets

(56) References Cited

U.S. PATENT DOCUMENTS

| | | |
|---|---|---|
| 2014/0047193 A1 | 2/2014 | Gross et al. |
| 2014/0082261 A1 | 3/2014 | Cohen et al. |
| 2015/0356020 A1* | 12/2015 | Desai ................. G06F 12/0897 |
| | | 711/103 |
| 2017/0068623 A1 | 3/2017 | Misra |
| 2017/0242584 A1 | 8/2017 | Zhang et al. |
| 2017/0293536 A1 | 10/2017 | Won et al. |
| 2018/0081765 A1* | 3/2018 | Camp ................... G06F 3/0619 |
| 2018/0129563 A1* | 5/2018 | Kim .................... G06F 11/1068 |
| 2021/0182192 A1 | 6/2021 | Benjamin et al. |

FOREIGN PATENT DOCUMENTS

| | | |
|---|---|---|
| KR | 10-2014-0083338 A | 7/2014 |
| KR | 10-1686340 B1 | 12/2016 |
| KR | 10-2019-0054974 A | 5/2019 |
| KR | 10-2017-0105133 A | 10/2019 |
| KR | 10-2020-0050169 A | 5/2020 |
| KR | 10-2020-0086143 A | 7/2020 |
| KR | 10-2021-0012085 A | 2/2021 |

* cited by examiner

STORAGE DEVICE AND METHOD FOR RESTORING META DATA THEREOF

CROSS-REFERENCE TO RELATED APPLICATIONS

This application claims priority under 35 U.S.C. § 119 to Korean Patent Application No. 10-2021-0155156 filed on Nov. 11, 2021, and Korean Patent Application No. 10-2022-0064426 filed on May 26, 2022, the collective subject matter of which is hereby incorporated by reference in its entirety.

BACKGROUND

Embodiments of the inventive concept relate generally to storage devices. More particularly, embodiments of the inventive concept relate to methods of generating journal data associated with a journal replay operation of a storage device and methods of restoring meta data by using journal data.

Semiconductor memory devices may be classified as volatile or non-volatile in relation to their operative nature. The volatile semiconductor memory devices are generally characterized by fast data access (e.g., read and write) speeds, but loses stored data in the absence of applied power. In contrast, stored data is validly retained in non-volatile semiconductor memory devices even in the absence of applied power. Accordingly, non-volatile semiconductor memory devices are used to store information that should be (or must be) retained, regardless of the state of applied power.

It follows that storage devices including non-volatile memory devices may retain data on a permanent or semi-permanent basis regardless of power state. However, some storage devices include both non-volatile and volatile semiconductor memory devices. In this regard, the volatile memory capacity may be less than the non-volatile memory capacity, wherein the volatile semiconductor memory device(s) provide relatively fast input/output speed(s) relative to the non-volatile semiconductor memory device(s). That is, certain storage devices may use one or more volatile semiconductor memory device(s) as a cache memory for one or more non-volatile semiconductor memory device(s).

However, as noted above, data stored in the volatile semiconductor memory device(s) of a storage device may be lost in the absence of applied power due to (e.g.,) a sudden power off (SPO) event or a general system crash. Accordingly, in order to prevent such data loss, some storage devices may store data present in the volatile semiconductor memory device(s) in the non-volatile semiconductor memory device(s) upon detecting power interruption. See, for example, published U.S. Patent Application No. 2017/0068623 filed on Sep. 3, 2017, the subject matter of which is hereby incorporated by reference.

SUMMARY

Embodiments of the inventive concept provide storage devices capable of generating journal data in response to (or based on) locality information of meta data and storing the meta data in a meta cache or a meta buffer based on the journal data including cache allocation information upon restoring the meta data.

According to some embodiments of the inventive concept, a storage device may include; a non-volatile memory device configured to store user data, a meta buffer configured to store meta data corresponding to the user data, a meta cache having an operating speed faster than that of the meta buffer, wherein a portion of the meta data is allocated to the meta cache, and a storage controller configured to generate the meta data and determine whether the meta data are stored in the meta buffer or stored in the meta cache in response to locality information of the meta data, wherein, when the meta data are updated, the storage controller generates journal data including a cache allocation flag in response to the locality information of the meta data, and the cache allocation flag includes cache allocation information indicating whether the meta data are allocated to the meta cache.

According to some embodiments of the inventive concept, an operating method of a storage device includes; identifying locality information related to meta data, upon updating of the meta data, determining whether the meta data are allocated to a meta cache in response to the locality information, generating journal data including a cache allocation flag related to the meta data, storing the journal data to a journal buffer, and moving the journal data from the journal buffer to a non-volatile memory device in response to a specified condition.

According to some embodiments of the inventive concept, an operating method of a storage device includes; loading journal data from a non-volatile memory device, identifying a cache allocation flag included in the journal data, and restoring meta data corresponding to the journal data to a storage controller in response to the cache allocation flag, wherein the cache allocation flag is a first flag when the meta data are allocated to a meta cache of the storage controller, and the cache allocation flag is a second flag when the meta data are stored to a meta buffer of the storage controller.

BRIEF DESCRIPTION OF THE DRAWINGS

Advantages, benefits and features, as well as the making and use of the inventive concept will become apparent upon consideration of the following detail description together with the accompanying drawings, in which.

DETAILED DESCRIPTION

Throughout the written description and drawings, like reference numbers and labels are used to denote like or similar elements, components, features and/or method steps.

Figure 1:
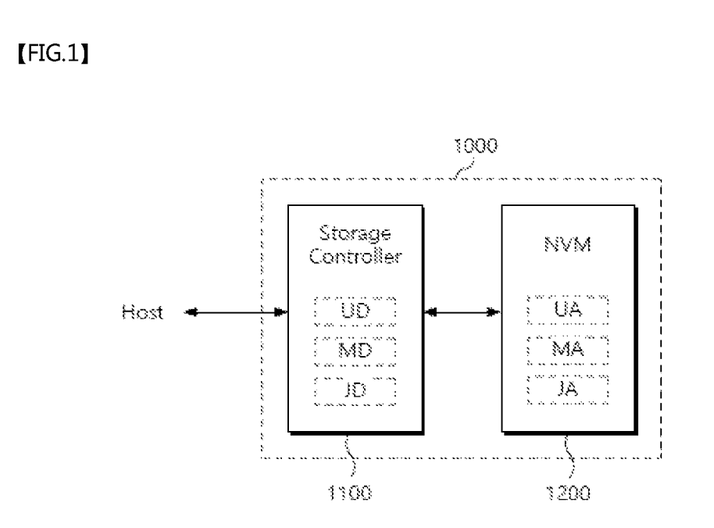
FIG. 1 is a block diagram illustrating a storage device 1000 according to embodiments of the inventive concept.

Figure (FIG.) 1 is a block diagram illustrating a storage device 1000 according to embodiments of the inventive concept. Referring to FIG. 1, the storage device 1000 may generally include a storage controller 1100 and a non-volatile memory device 1200. However, the storage controller 1100 and the non-volatile memory device 1200 may be variously implemented as a chip, a chip package, a set of chips, a module, or a memory system, such as a memory card, a memory stick, or a solid state drive (SSD).

The storage controller 1100 may be configured to substantially control operation of the non-volatile memory device 1200. For example, in response to various request(s) received from a host (not shown), the storage controller 1100 may access data stored by the non-volatile memory device 1200 (e.g., write data in the non-volatile memory device 1200, read data from the non-volatile memory device 1200, etc.). In order to access data stored by the non-volatile memory device 1200, the storage controller 1100 will provide at least one of a command, an address, data, and a control signal to the non-volatile memory device 1200.

For example, the storage controller 1100 may control operation of the non-volatile memory device 120 in a manner that effectively enables execution of an erase operation by the non-volatile memory device 1200 in relation to a file system of the host. Accordingly, certain disadvantages associated with the non-volatile memory device 1200 (e.g., erase-before-write requirements and mismatches between an erase unit and a write unit) and may be redeemed through effective control of the non-volatile memory device 1200 by the storage controller 1100. In this regard, the storage controller 1100 may "map" logical address(es) generated by the file system of the host onto corresponding physical address(es) associated with the non-volatile memory device 1200. The storage controller 1100 may also enable a wear leveling function that manages the operating lifetime of memory cells in the non-volatile memory device 1200 and/or a garbage collection function that efficiently manages the useful data capacity of the non-volatile memory device 1200.

In some embodiments, under control of the storage controller 1100, the non-volatile memory device 1200 may store "write (or program) data" received from the storage controller 1100 or retrieve "read data" from the non-volatile memory device 1200 and communicate same to the storage controller 1100.

The non-volatile memory device 1200 may include a plurality of memory blocks. In some embodiments, each of the plurality of memory blocks may have a three-dimensional memory structure in which word line layers are stacked in a direction substantially perpendicular to a substrate.

In some embodiments, respective (continuous or discontinuous) portions of the memory space provided by the non-volatile memory device 1200 may designated as a user area UA, a meta area MA, and a journal area JA. Here, the storage controller 1100 may temporarily store user data UD received from the host to a volatile memory device. For example, the storage controller 1100 may store the user data UD in the user area UA of the non-volatile memory device 1200. The storage controller 1100 may generate meta data MD corresponding to the user data UD. The storage controller 1100 may store the meta data MD in the meta area MA of the non-volatile memory device 1200. In this regard, the storage controller 1100 may generate journal data JD sufficient to restore the meta data MD. For example, the journal data JD may be defined as data that include meta information corresponding to the meta data MD. The storage controller 1100 may store the journal data JD in the journal area JA of the non-volatile memory device 1200.

Figure 2:
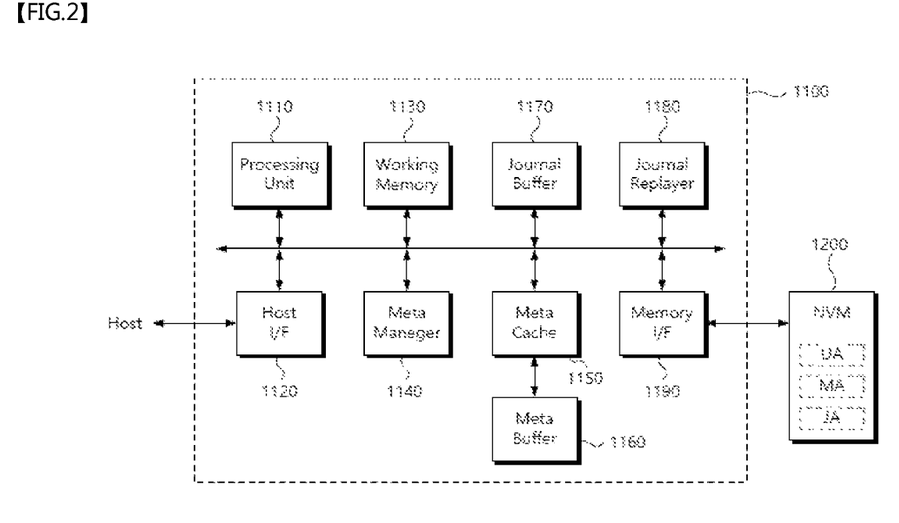
FIG. 2 is a block diagram further illustrating in one example the storage controller 1100 of FIG. 1.

FIG. 2 is a block diagram further illustrating in one example the storage controller 1100 of FIG. 1. Referring to FIG. 2, the storage controller 1100 may include a processing unit 1110, a host interface 1120, a working memory 1130, a meta manager 1140, a meta cache 1150, a meta buffer 1160, a journal buffer 1170, a journal replayer 1180, and a memory interface 1190. However, the storage controller 1100 may further include additional above components, such as a read only memory (ROM) storing code data necessary to an initial booting operation.

In some embodiments, the processing unit 1110 may include a central processing unit (CPU) or a micro-processor. The processing unit 1110 may be used to manage overall operation of the storage controller 1100. In this regard, the processing unit 1110 may be configured to drive firmware controlling operation of the storage controller 1100.

In some embodiments, the host interface 1120 may provide an interface between the host and the storage controller 1100. The host and the storage controller 1100 may be interconnected and communicate in relation to one or more conventionally understood and commercially available interfaces, such as an advanced technology attachment (ATA) interface, a serial ATA (SATA) interface, an external SATA (e-SATA) interface, a small computer small interface (SCSI), a serial attached SCSI (SAS), a peripheral component interconnection (PCI) interface, a PCI Express (PCIe) interface, a universal serial bus (USB) interface, an IEEE 1394 interface, a universal flash store (UFS) interface, an NVMe, and a card interface.

In some embodiments, software (or firmware) used to control operation of the storage controller 1100, as well as related data (e.g., the user data UD), may be loaded in the working memory 1130 (e.g., a Dynamic Random Access Memory (DRAM)). Once loaded, the software and related data may be further processed using the processing unit 1110.

In some embodiments, the meta manager 1140 may perform various functions, such as address managing, garbage collection, and wear-leveling. Further in this regard, the meta manager 1140 may map logical address(es) generated by a file system of the host onto physical address(es) associated with the non-volatile memory device 1200, and thereafter, generate an address mapping table.

In some embodiments, the meta manager 1140 may generate the meta data MD corresponding to the user data UD. The meta manager 1140 may store and manage the meta data MD to the meta cache 1150 or the meta buffer 1160. For example, the meta manager 1140 may store the meta data MD with the high use frequency to the meta cache 1150. The meta manager 1140 may store the meta data MD with the high locality to the meta cache 1150. The meta manager 1140 may store the meta data MD with the low use frequency to the meta buffer 1160. The meta manager 1140 may store the meta data MD with the low locality to the meta buffer 1160. The meta manager 1140 may update the meta data MD based on changes in the user data UD, such as (e.g.,) execution of a garbage collection operation by the non-volatile memory device 1200. The meta manager 1140 may periodically store the meta data MD in the meta cache 1150 or the meta buffer 1160 in the meta area MA of the non-volatile memory device 1200.

Here, the term "locality" denotes a probability that data are will again be accessed during a defined time period. Thus, the term "locality" may relate to a temporal locality and/or a spatial locality, wherein "temporal locality" denotes a high probability that recently accessed data will again be accessed and "spatial locality" denotes a high probability of accessing data having a nearby address in relation to accessed data.

In some embodiments, the meta manager 1140 may generate the journal data JD when the meta data MD are updated. For example, the journal data JD may include update information of the meta data MD (e.g., an address mapping table). The journal data JD may be defined as data that include meta information corresponding to the meta data MD. The meta manager 1140 may store the journal data JD thus generated to the journal buffer 1170. The meta manager 1140 may incorporate a cache allocation flag 20 (see, e.g., FIG. 4) in the journal data JD, based on locality information of the meta data MD. The meta manager 1140 may store the journal data JD present in the journal buffer 1170 in the journal area JA of the non-volatile memory device 1200, based on a specified condition. As an example, when the journal buffer 1170 is full, the meta manager 1140 may move the journal data JD present in the journal buffer 1170 to the journal area JA of the non-volatile memory device 1200. As another example, when the operative state of the storage device 1000 suddenly changes (e.g., when the sudden power off (SPO) or the system crash occurs), the meta manager 1140 may move the journal data JD present in the journal buffer 1170 to the non-volatile memory device 1200.

In some embodiments, the meta cache 1150 may be implemented using a memory medium with a faster operating speed than the meta buffer 1160. As an example, the meta cache 1150 may include an SRAM or an L2 cache. The meta cache 1150 may be implemented with a memory medium providing a lesser memory capacity than the meta buffer 1160. Thus, meta data MD with high locality may be stored in the meta cache 1150. Further, meta data MD with high locality may be simultaneously stored in the meta cache 1150 and the meta buffer 1160.

In some embodiments, the meta buffer 1160 may be implemented with a volatile memory that is faster (in its operating speed) than the non-volatile memory device 1200. As an example, the meta buffer 1160 may include a DRAM. Meta data MD with low locality may be stored in the meta buffer 1160.

In some embodiments, the journal buffer 1170 may be implemented with a volatile memory that is faster than the non-volatile memory device 1200. As an example, the journal buffer 1170 may include a DRAM. As another example, the journal buffer 1170 may be included in the working memory 1130.

In some embodiments, when the journal replay operation is executed (or performed) by the storage device 1000 (e.g., when the storage device 1000 is started following a power event), the journal replayer 1180 may restore the meta data MD based on the journal data JD. For example, the journal replayer 1180 may load the meta data MD of the non-volatile memory device 1200 onto the meta cache 1150 or the meta buffer 1160 based on the cache allocation flag 20 included in the journal data JD. The journal replayer 1180 may restore the meta data MD to a pre-power-event state for the storage device 1000 using the cache allocation flag 20 included in the journal data JD. As such, the storage device 1000 may be quickly restarted utilizing the meta cache 1150 in the journal replay operation.

In some embodiments, the memory interface 1190 may provide an interface between the storage controller 1100 and the non-volatile memory device 1200. For example, data processed by the processing unit 1110 may be stored in the non-volatile memory device 1200 through the memory interface 1190. For another example, data stored in the non-volatile memory device 1200 may be provided to the processing unit 1110 through the memory interface 1190.

Figure 3:
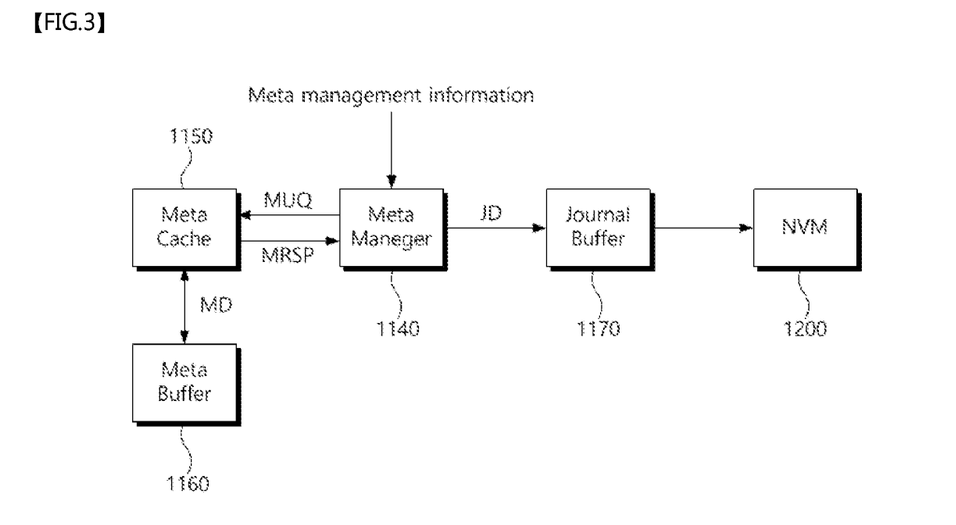
FIG. 3 is a conceptual diagram illustrating in one example operation of the storage device 1000 of FIG. 1 in the generating of journal data.

FIG. 3 is a conceptual diagram illustrating in one example operation of the storage device 1000 in generating journal data. Referring to FIG. 3, the meta manager 1140 may generate and update meta data MD during runtime. Once the meta data MD are updated, the meta manager 1140 may generate the journal data JD in accordance with a specified format.

In response to a meta response MRSP corresponding to a meta update request MUQ, the meta manager 1140 may determine whether the meta data MD are allocated to the meta cache 1150. For example, the meta manager 1140 may send the meta update request MUQ to the meta cache 1150 together with the meta data MD. The meta manager 1140 may receive the meta response MRSP corresponding to the meta update request MUQ from the meta cache 1150. The meta response MRSP may include information (hereinafter "meta cache allocation information") indicating whether the meta data MD are allocated to the meta cache 1150. As an example, when it is determined that the meta data MD are allocated to the meta cache 1150, the meta response MRSP may include first cache allocation information (e.g., cache hit). Upon receiving the first cache allocation information, the meta manager 1140 may determine that the corresponding meta data MD are allocated to the meta cache 1150. However, when it is determined that the meta data MD are not allocated to the meta cache 1150, but instead are stored in only the meta buffer 1160, the meta response MRSP may include second cache allocation information (e.g., cache miss). Upon receiving the second cache allocation information, the meta manager 1140 may determine that the corresponding meta data MD are not allocated to the meta cache 1150.

In accordance with a response time of the meta response MRSP, the meta manager 1140 may determine whether the meta data MD are allocated to the meta cache 1150. For example, when the response time of the meta response MRSP is less than or equal to a reference time, the meta manager 1140 may determine that the meta data MD are allocated to the meta cache 1150. However, when the response time of the meta response MRSP is greater than the response time, the meta manager 1140 may determine that the meta data MD are not allocated to the meta cache 1150.

The meta manager 1140 may also determine the state of the meta cache 1150 in relation to the meta data MD in response to meta management information. For example, the meta manager 1140 may receive meta management information including locality information for the meta data MD from the host or the processing unit 1110. Accordingly, the meta manager 1140 may deduce locality information for the meta data MD in response to the meta management information. In some embodiments, the meta management information may include information related to or derived from operation of the non-volatile memory device 1200 (e.g., garbage collection, wear leveling, memory block reclamation, etc.). Further in this regard, the meta management information may include update-related information for the meta data MD. That is, the meta management information may include information related to whether scheduled update of the meta data MD will be sequential or random in nature. When it is determined based on the locality information that the locality exists (or when it is determined that the locality is greater than or equal to a specified value), the meta manager 1140 may determine that the meta data MD are allocated to the meta cache 1150. However, when it is determined based on the locality information that the locality does not exist (or when it is determined that the locality is less than the specified value), the meta manager 1140 may determine that the meta data MD are not allocated to the meta cache 1150.

The meta manager 1140 may generate the journal data JD in response to the meta cache allocation information. In some embodiments, the journal data JD may include the cache allocation flag 20 indicating the meta cache allocation information. For example, when it is determined that the meta data MD are allocated to the meta cache 1150, the meta manager 1140 may generate the meta data MD including a first flag. However, when it is determined that the meta data MD are not allocated to the meta cache 1150, the meta manager 1140 may generate the meta data MD including a second flag. As an example, the cache allocation flag 20 may be expressed by 1-bit information. In such a case, the first flag may be expressed by logic "1", and the second flag may be expressed by logic "0".

The meta manager 1140 may temporarily store the generated journal data JD in the journal buffer 1170. The meta manager 1140 may store the journal data JD present in the journal buffer 1170 to the non-volatile memory device 1200, based on the specified condition. As an example, when the journal buffer 1170 is deemed to be "full," the meta manager 1140 may move (or transfer) the journal data JD from the journal buffer 1170 to the non-volatile memory device 1200. As another example, when an operative state of the storage device 1000 suddenly changes (e.g., upon detecting a sudden power off (SPO) or system crash), the meta manager 1140 may move the journal data JD from the journal buffer 1170 to the non-volatile memory device 1200. In this regard, the amount of journal data JD may be relatively small, as compared with an amount of meta data MD stored in the meta cache 1150 or the meta buffer 1160. Accordingly, the journal data JD may be moved to the non-volatile memory device 1200 relatively quickly upon detecting a sudden state change, thereby improving reliability of operation for the storage device 1000.

Figure 4:
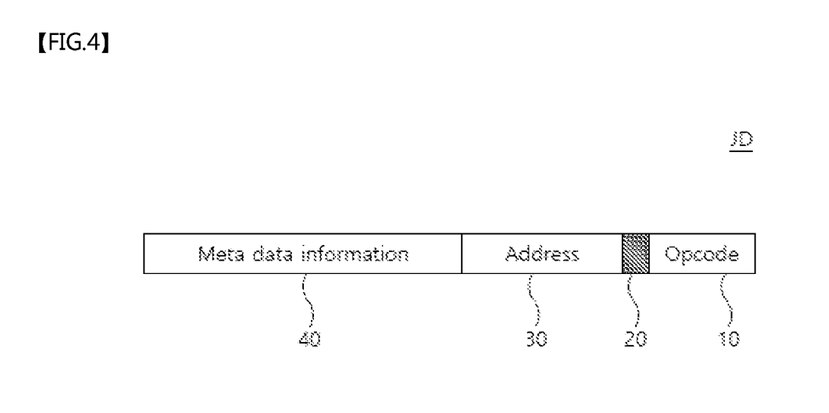
FIG. 4 is a conceptual diagram illustrating in one example a data structure or format of journal data according to embodiments of the inventive concept.

FIG. 4 is a conceptual diagram illustrating an exemplary format that may be used for journal data according to embodiments of the inventive concept. Referring to FIG. 4, the journal data JD may include an opcode 10, the cache allocation flag 20, address information 30, and meta data information 40.

The opcode 10 may include general information characterizing the journal data JD (e.g., a size of the journal data JD and a recognition factor for the journal data JD). The cache allocation information may indicate whether the meta data MD are being allocated to the meta cache 1150 when the journal data JD are generated. The address in formation (or address code) 30 may include index information (e.g., a logical address) for the meta data MD. The meta data information 40 may include management information characterizing the meta data MD (e.g., identifying a physical address of the non-volatile memory device 1200 at which the meta data MD are stored, update information for the meta data MD, etc.).

Based on locality information associated with the meta data MD, the meta manager 1140 of FIG. 3 may include the cache allocation information in the journal data JD. For example, when it is determined that the meta data MD are allocated to the meta cache 1150, the meta manager 1140 may generate the meta data MD including a first flag. However, when it is determined that the meta data MD are not allocated to the meta cache 1150, the meta manager 1140 may generate the meta data MD including a second flag. As an example, the cache allocation flag 20 may be expressed by 1-bit information; in this case, the first flag may be expressed by logic "1", and the second flag may be expressed by logic "0".

Figure 5:
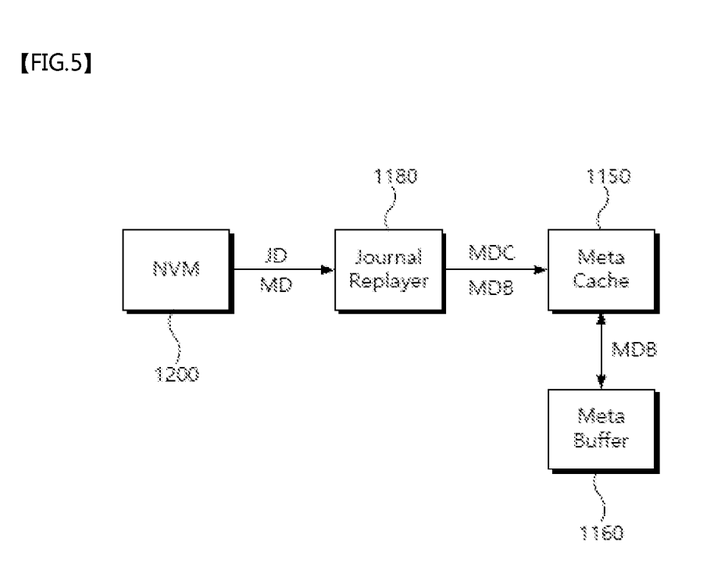
FIG. 5 is a conceptual diagram illustrating a journal replay operation of a storage device according to embodiment.

FIG. 5 is a conceptual diagram illustrating in one example a journal replay operation performed by the storage device 1000 according to embodiments of the inventive concept. Referring to FIG. 5, the journal replay operation may be performed through the journal replayer 1180. In this regard, the term "journal replay operation" denotes an operation performed by the storage device 1000 during which meta data MD are restored when the storage device 1000 is started up following a power off event.

Here, the journal replayer 1180 may read meta data MD corresponding to the journal data JD from the non-volatile memory device 1200. The journal replayer 1180 may identify the cache allocation flag 20 included in the journal data JD. For example, when the cache allocation flag 20 includes the first flag indicating that the meta data MD are allocated to the meta cache 1150, the journal replayer 1180 may load the corresponding meta data MD (e.g., cache meta data MDC or first meta data) onto the meta cache 1150. However, when the cache allocation flag 20 includes the second flag indicating that the meta data MD are not allocated to the meta cache 1150, the journal replayer 1180 may load the corresponding meta data MD (e.g., buffer meta data MDB or second meta data) onto the meta buffer 1160. As such, meta data MD having an identical state to that before the power off event may be restored to the meta cache 1150 or the meta buffer 1160. According to this approach, meta data MD having a defined degree of locality may be restored to the meta cache 1150, whereas meta data MD (e.g., random data) lacking the defined degree of locality may be restored to the meta buffer 1160. In this manner, the start (or restart) up time for the storage device 1000 following a power off event may be improved.

Figure 6:
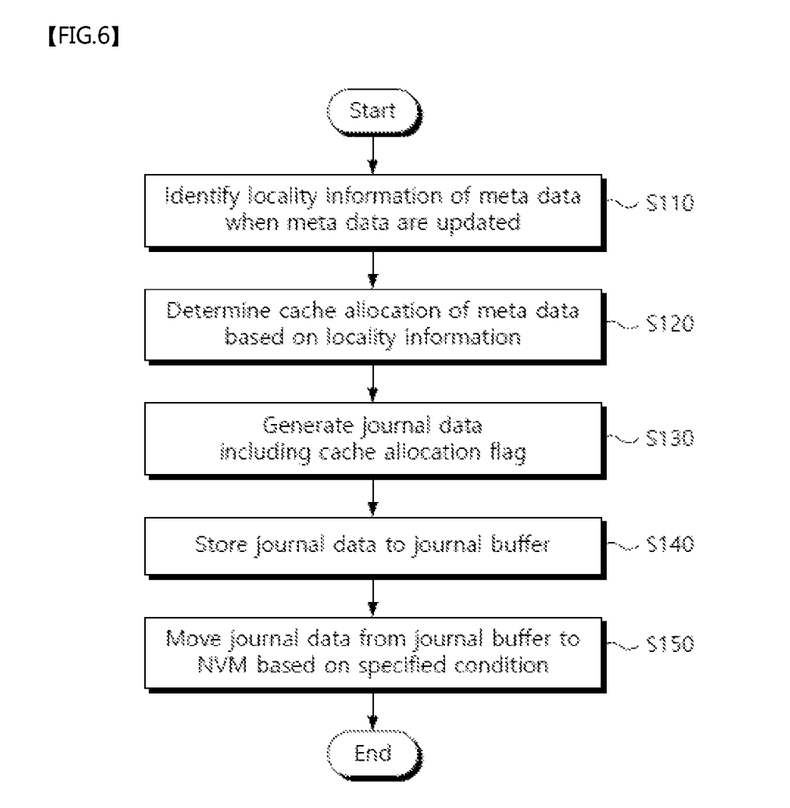
FIG. 6 is a flowchart illustrating a journal data management method of a storage device according to embodiments of the inventive concept.

FIG. 6 is a flowchart illustrating a journal data management method for the storage device 1000 according to embodiments of the inventive concept. Referring to FIGS. 2, 3, and 6, the storage device 1000 is assumed to include the meta manager 1140 that manages the meta data MD and the journal data JD. The meta manager 1140 may generate the journal data JD including the cache allocation flag 20 based on the meta response MRSP of the meta cache 1150.

When meta data MD are updated, the meta manager 1140 of the storage controller 1100 may identify locality information for the meta data MD (S110). For example, the meta manager 1140 of the storage controller 1100 may identify the locality of the meta data MD in response to the meta response MRSP of the meta cache 1150. Alternately, the meta manager 1140 of the storage controller 1100 may receive locality information for the meta data MD from a host or the processing unit 1110.

The meta manager 1140 of the storage controller 1100 may then determine whether the meta data MD are allocated to the meta cache 1150 in relation to the locality information (S120). For example, when it is determined that the meta data MD has locality, the meta manager 1140 of the storage controller 1100 may determine that the meta data MD are allocated to the meta cache 1150. However, when it is determined that the meta data MD lacks locality, the meta manager 1140 of the storage controller 1100 may determine that the meta data MD are not allocated to the meta cache 1150.

The meta manager 1140 of the storage controller 1100 may generate the journal data JD including the cache allocation flag 20 (S130). For example, when it is determined that the meta data MD are allocated to the meta cache 1150, the meta manager 1140 of the storage controller 1100 may generate the journal data JD including the cache allocation flag 20 (e.g., the first flag) indicating that the meta data MD are allocated to the meta cache 1150. However, when it is determined that the meta data MD are not allocated to the meta cache 1150, the meta manager 1140 of the storage controller 1100 may generate the journal data JD including the cache allocation flag 20 (e.g., the second flag) indicating that the meta data MD are not allocated to the meta cache 1150.

The meta manager 1140 of the storage controller 1100 may then store the generated journal data JD in the journal buffer 1170 (S140). For example, the meta manager 1140 of the storage controller 1100 may temporarily store the journal data JD in the journal buffer 1170.

Thereafter, the meta manager 1140 of the storage controller 1100 may move the journal data JD from the journal buffer 1170 to the non-volatile memory device 1200 in accordance with one or more defined condition(s) (S150). As an example, when the journal buffer 1170 is full, the meta manager 1140 may move the journal data JD from the journal buffer 1170 to the journal area JA of the non-volatile memory device 1200. As another example, when the storage device 1000 experiences a power event (e.g., a sudden power off (SPO) or system crash), the meta manager 1140 may move the journal data JD from the journal buffer 1170 to the non-volatile memory device 1200.

Figure 7:
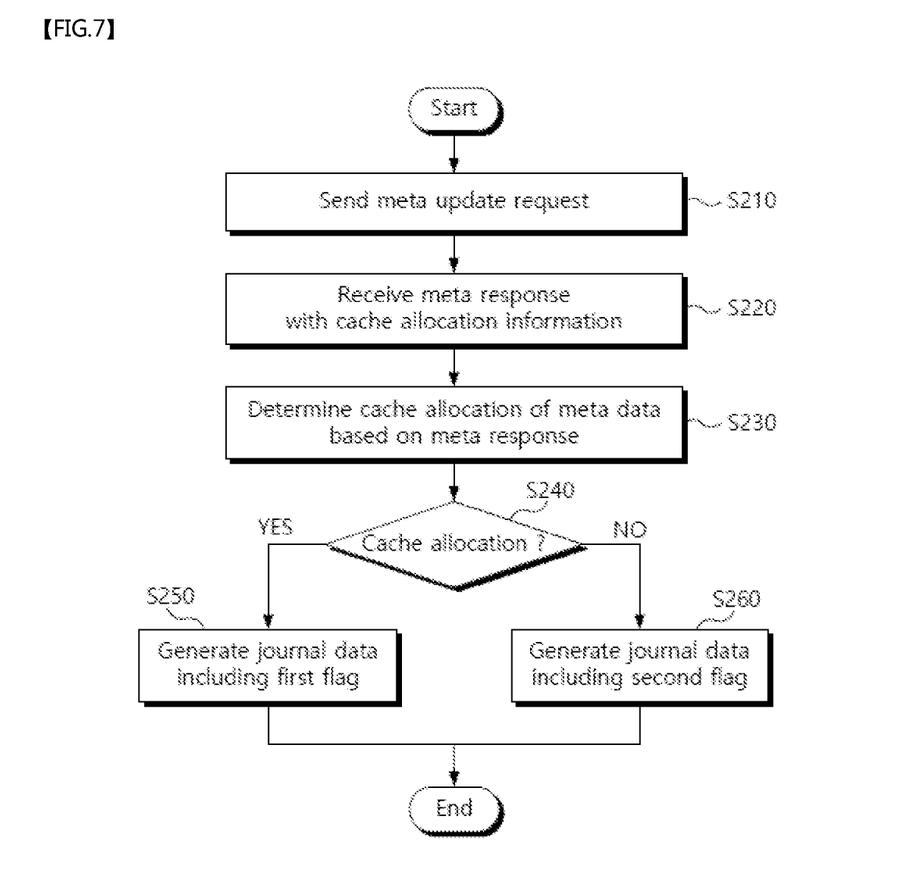
FIGS. 7, 8 and 9 are respective flowcharts illustrating various examples of journal data generation method of a storage device according to embodiments of the inventive concept.

FIG. 7 is a flowchart illustrating in one example a method of generating journal data in a storage device according to embodiments of the inventive concept. Referring to FIGS. 2, 3, and 7, the meta manager 1140 of the storage controller 1100 may generate the journal data JD including the cache allocation flag 20 based on the meta response MRSP of the meta cache 1150.

Thus, when meta data MD are updated, the meta manager 1140 of the storage controller 1100 may send the meta update request MUQ to the meta cache 1150 (S210). For example, the meta manager 1140 of the storage controller 1100 may send the meta update request MUQ to the meta cache 1150 together with the meta data MD.

The meta manager 1140 of the storage controller 1100 may receive the meta response MRSP including cache allocation information from the meta cache 1150 (S220). For example, the cache allocation information may indicate whether the meta data MD are allocated to the meta cache 1150. When the meta data MD are allocated to the meta cache 1150, the meta response MRSP may include the first cache allocation information (e.g., cache hit). However, when the meta data MD are not allocated to the meta cache 1150 and are stored in only the meta buffer 1160, the meta response MRSP may include the second cache allocation information (e.g., cache miss).

The meta manager 1140 of the storage controller 1100 may determine whether the meta data MD are allocated to the meta cache 1150 in response to the meta response MRSP (S230). For example, when the first cache allocation information is received, the meta manager 1140 of the storage controller 1100 may determine that the corresponding meta data MD are allocated to the meta cache 1150. When the second cache allocation information is received, the meta manager 1140 of the storage controller 1100 may determine that the corresponding meta data MD are not allocated to the meta cache 1150.

In accordance with the determination of meta cache allocation state (S240), the meta manager 1140 of the storage controller 1100 may perform one of two possible operations. For example, when it is determined that the meta data MD are allocated to the meta cache 1150 (S240=YES), the meta manager 1140 may generate the journal data JD including the first flag (e.g., logic "1"), wherein the first flag is the cache allocation flag 20 indicating that the meta data MD are allocated to the meta cache 1150 (S250). Alternately, when it is determined that the meta data MD are not allocated to the meta cache 1150 (S240=NO), the meta manager 1140 may generate the journal data JD including the second flag (e.g., logic "0"), wherein the second flag is the cache allocation flag 20 indicating that the meta data MD are not allocated to the meta cache 1150 (S260).

In some embodiments, steps S210 and S220 may correspond to step S110 in the method of FIG. 6, step S230 may correspond to step S120 in the method of FIG. 6, and steps S240, S250 and S260 may correspond to step S130 in the method of FIG. 6.

Figure 8:
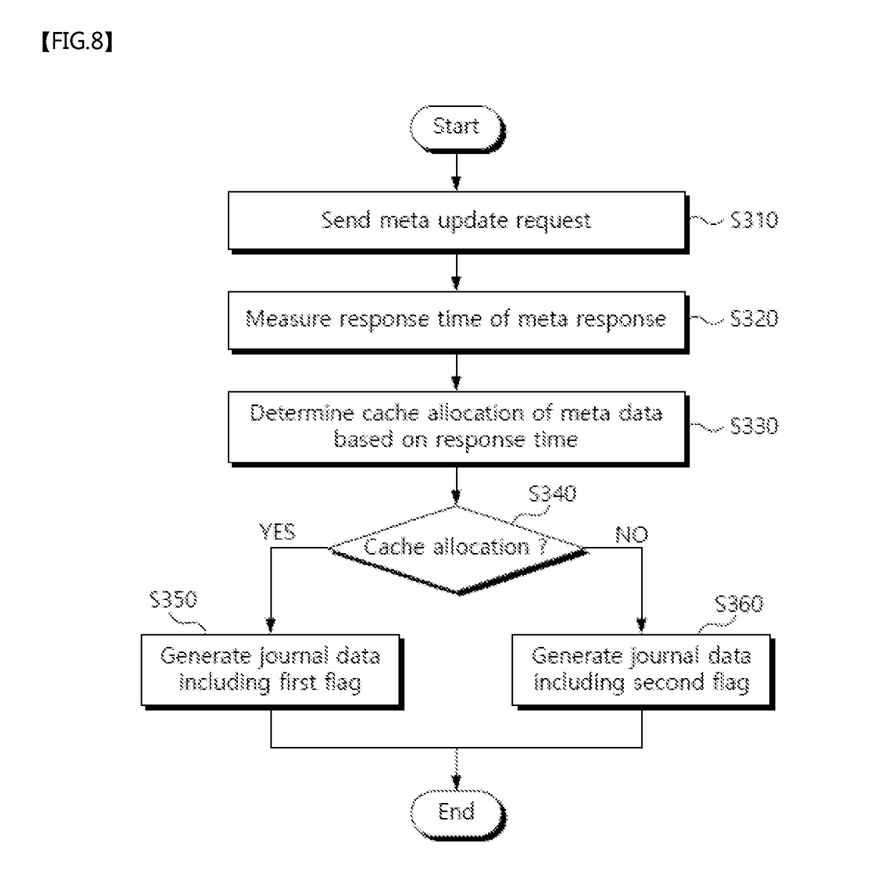

FIG. 8 is a flowchart illustrating in another example the generating of journal data in a storage device according to embodiments of the inventive concept. Referring to FIGS. 2, 3, and 8, the meta manager 1140 of the storage controller 1100 may generate the journal data JD including the cache allocation flag 20 based on a response time of the meta response MRSP of the meta cache 1150.

Accordingly, when meta data MD are updated, the meta manager 1140 of the storage controller 1100 may send the meta update request MUQ to the meta cache 1150 (S310). For example, the meta manager 1140 of the storage controller 1100 may send the meta update request MUQ to the meta cache 1150 together with the meta data MD.

The meta manager 1140 of the storage controller 1100 may receive the meta response MRSP from the meta cache 1150 (S320). Here, the meta manager 1140 of the storage controller 1100 may determine (e.g., measure or detect) the response time of the meta response MRSP. For example, when the response time of the meta response MRSP is relatively short, the meta manager 1140 of the storage controller 1100 may determine that the meta data MD are allocated to the meta cache 1150 and the meta cache 1150 immediately sends the meta response MRSP. However, when the response time of the meta response MRSP is relatively long, the meta manager 1140 of the storage controller 1100 may determine that the meta cache 1150 sends the meta response MRSP after the meta data MD are stored to the meta buffer 1160 through the meta cache 1150.

Thereafter, the meta manager 1140 of the storage controller 1100 may determine whether the meta data MD are allocated to the meta cache 1150 in relation to a response time associated with the meta response MRSP (hereafter, "meta response time") (S330). For example, if the meta response time is less than or equal to a reference time, the meta manager 1140 of the storage controller 1100 may determine that the corresponding meta data MD are allocated to the meta cache 1150. However, if the meta response time is greater than the reference time, the meta manager 1140 of the storage controller 1100 may determine that the corresponding meta data MD are not allocated to the meta cache 1150.

The meta manager 1140 of the storage controller 1100 may then perform either stop S350 or step S360 depending on whether the meta data MD are allocated to the meta cache 1150 (S340). That is, when it is determined that the meta data MD are allocated to the meta cache 1150 (S340=YES), the meta manager 1140 of the storage controller 1100 may perform step S350. However, when it is determined that the meta data MD are not allocated to the meta cache 1150

(S340=NO), the meta manager 1140 of the storage controller 1100 may perform step S360.

Consistent with the foregoing, when it is determined that the meta data MD are allocated to the meta cache 1150 (S340=YES), the meta manager 1140 may generate the journal data JD including the first flag (e.g., logic "1") (S350), wherein the first flag is the cache allocation flag 20 indicating that the meta data MD are allocated to the meta cache 1150. However, when it is determined that the meta data MD are not allocated to the meta cache 1150 (S340=NO), the meta manager 1140 may generate the journal data JD including the second flag (e.g., logic "0") (S360), wherein the second flag is the cache allocation flag 20 indicating that the meta data MD are not allocated to the meta cache 1150.

In some embodiments, steps S310 and S320 may correspond to step S110 of the method of FIG. 6, step S330 may correspond to step S120 of the method of FIG. 6, and steps S340, S350 and S360 may correspond to step S130 of the method of FIG. 6.

Figure 9:
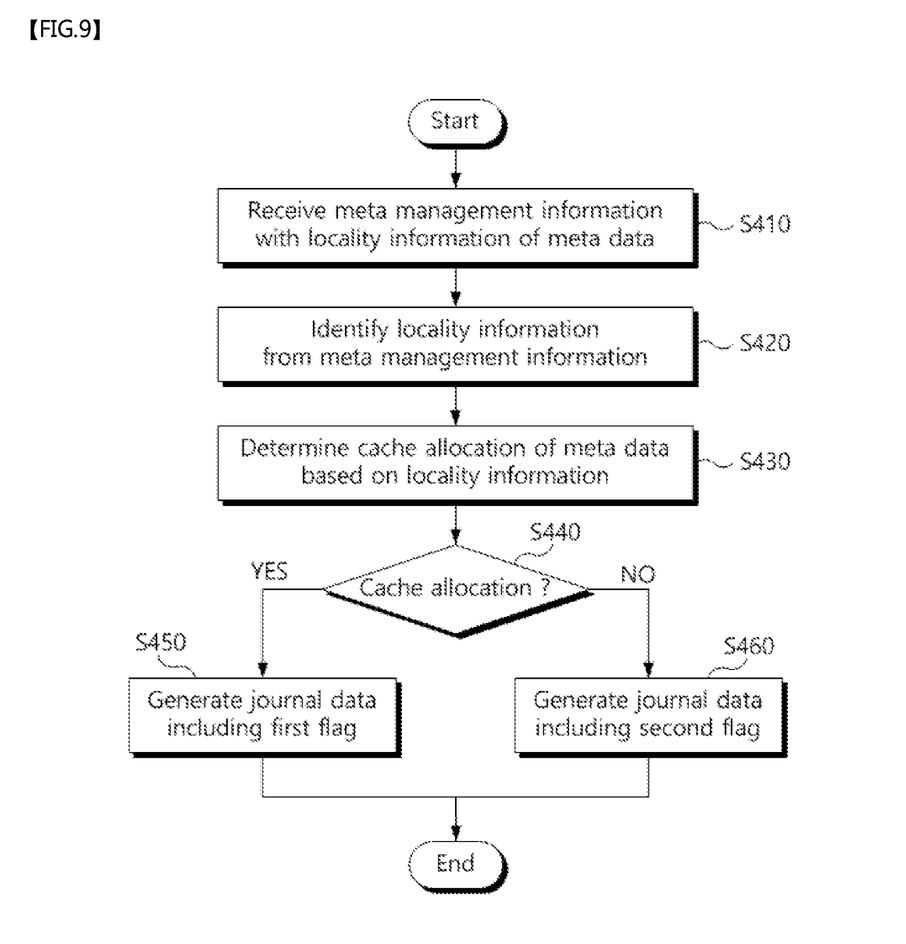

FIG. 9 is a flowchart illustrating in still another example the generating of journal data in a storage device according to embodiments of the inventive concept. Referring to FIGS. 2, 3, and 9, the meta manager 1140 of the storage controller 1100 may generate the journal data JD including the cache allocation flag 20 in response to meta management information received from the host or the processing unit 1110.

Accordingly, the meta manager 1140 of the storage controller 1100 may receive the meta management information from the processing unit 1110 (S410). For example, the meta management information may include locality information of the meta data MD together with an update request for the meta data MD.

The meta manager 1140 of the storage controller 1100 may identify the locality information of the meta data MD from the meta management information (S420). For example, the host or the processing unit 1110 may send scheduling information about data access together with the meta management information. As such, the meta manager 1140 of the storage controller 1100 may identify information in relation to recently accessed data that are again accessed or whether data of a neighbor address are accessed. As an example, the meta management information may include management information of the non-volatile memory device 1200 such as garbage collection, wear leveling, memory block reclamation, etc. The meta management information may include update-related information of the meta data MD. The meta management information may include information indicating whether the update of the meta data MD is sequentially or randomly scheduled. The meta manager 1140 may deduce the locality information of the meta data MD through the management information of the non-volatile memory device 1200 or the update-related information of the meta data MD.

The meta manager 1140 of the storage controller 1100 may determine whether the meta data MD are allocated to the meta cache 1150 in response to the locality information (S430). For example, when it is determined in relation to the locality information that the locality exists (e.g., when it is determined that locality is greater than or equal to the specified threshold value), the meta manager 1140 may determine that the meta data MD are allocated to the meta cache 1150. However, when it is determined based on the locality information that the locality does not exist (e.g., when it is determined that locality is less than the specified threshold value), the meta manager 1140 may determine that the meta data MD are not allocated to the meta cache 1150.

The meta manager 1140 of the storage controller 1100 may then perform either step S450 or step S460 in accordance with determining whether the meta data MD are allocated to the meta cache 1150 (S440). When it is determined that the meta data MD are allocated to the meta cache 1150, the meta manager 1140 of the storage controller 1100 may perform step S450. However, when it is determined that the meta data MD are not allocated to the meta cache 1150, the meta manager 1140 of the storage controller 1100 may perform step S460.

That is, when it is determined that the meta data MD are allocated to the meta cache 1150 (S440=YES), the meta manager 1140 may generate the journal data JD including the first flag (e.g., logic "1"), wherein the first flag is the cache allocation flag 20 indicating that the meta data MD are allocated to the meta cache 1150 (S450). However, when it is determined that the meta data MD are not allocated to the meta cache 1150 (S440=NO), the meta manager 1140 may generate the journal data JD including the second flag (e.g., logic "0"), wherein the second flag is the cache allocation flag 20 indicating that the meta data MD are not allocated to the meta cache 1150 (S460).

Those skilled in the art will appreciate that in the foregoing example, the first flag and the second flag are implemented using a single data bit, however, the inventive concept is not limited thereto.

In some embodiments, steps S410 and S420 may correspond to step S110 of the method of FIG. 6, step S430 may correspond to step S120 in the method of FIG. 6, and steps S440, S450 and S460 may correspond to step S130 of the method of FIG. 6.

Figure 10:
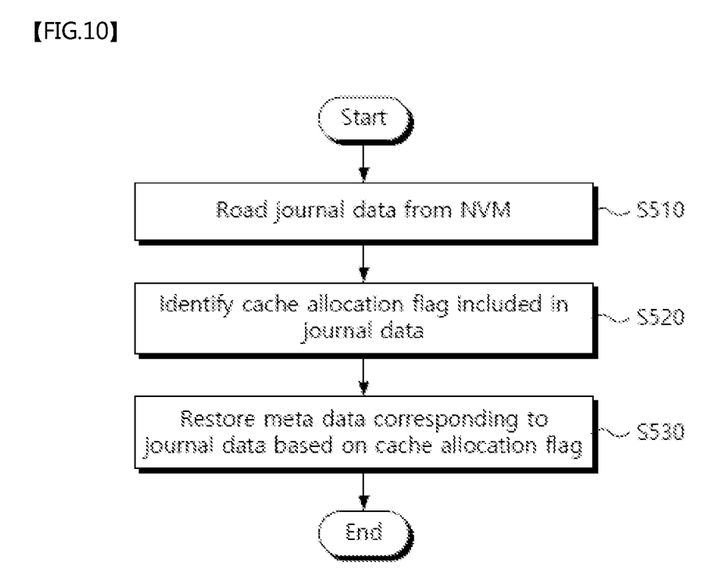
FIG. 10 is a flowchart illustrating a journal replay operation of a storage device according to embodiments of the inventive concept.

FIG. 10 is a flowchart illustrating a journal replay operation that may be performed by a storage device according to embodiments of the inventive concept. Referring to FIGS. 2, 5, and 10, the storage device 1000 may perform the journal replay operation. More particularly, the journal replay operation may be performed using the journal replayer 1180 of the storage controller 1100. IN this regard, the term "journal replay operation" denotes an operation during which meta data MD are restored in the storage device 1000 following a power event.

Accordingly, the journal replayer 1180 of the storage controller 1100 may load the journal data JD from the non-volatile memory device 1200 (S510). For example, the journal replayer 1180 of the storage controller 1100 may load the meta data MD corresponding to the journal data JD together with the journal data JD.

The journal replayer 1180 of the storage controller 1100 may identify the cache allocation flag 20 included in the journal data JD (S520). For example, the cache allocation flag 20 may include the first flag and the second flag. The first flag may indicate that the meta data MD corresponding to the journal data JD are allocated to the meta cache 1150. The second flag may indicate that the meta data MD corresponding to the journal data JD are not allocated to the meta cache 1150.

The journal replayer 1180 of the storage controller 1100 may restore the meta data MD corresponding to the journal data JD based on the cache allocation flag 20 (S530). For example, when the cache allocation flag 20 includes the first flag indicating that the meta data MD are allocated to the meta cache 1150, the journal replayer 1180 of the storage controller 1100 may allocate the corresponding meta data MD (e.g., the cache meta data MDC or the first meta data) to the meta cache 1150. When the cache allocation flag 20 includes the second flag indicating that the meta data MD are not allocated to the meta cache 1150, the journal replayer

1180 may store the corresponding meta data MD (e.g., the buffer meta data MDB or the second meta data) to the meta buffer 1160.

In accordance with the foregoing method, meta data MD that is identical to that before the power event may be restored to the meta cache 1150 or the meta buffer 1160. As such, first meta data MD (e.g., sequential data) having locality may be restored to the meta cache 1150, and second meta data MD (e.g., random data) lacking locality may be restored to the meta buffer 1160. In this manner, the speed with which the storage device 1000 may be restarted following a power event may be improved.

According to certain embodiments of the inventive concept, a storage device may generate journal data including cache allocation information in response to locality information of meta data. Also, according to embodiments of the inventive concept, the operating recovery time (e.g., a time to restart operation following a power event) for a storage device may be reduced by utilizing a meta cache when the meta data are restored in response to journal data including the cache allocation information.

While the present disclosure has been described with reference to certain illustrated embodiments thereof, it will be apparent to those of ordinary skill that various changes and modifications may be made thereto without departing from the scope of the inventive concept, as set forth in the following claims.

What is claimed is:

1. A storage device comprising:
    a non-volatile memory device configured to store user data;
    a meta buffer configured to store meta data corresponding to the user data;
    a meta cache having an operating speed faster than an operating speed of the meta buffer; and
    a storage controller configured to generate the meta data and determine whether the meta data are stored in the meta buffer or stored in the meta cache in response to locality information of the meta data,
    wherein, when the meta data are updated, the storage controller is configured to generate journal data including a cache allocation flag in response to the locality information of the meta data,
    wherein, when the meta data are allocated to the meta cache, the cache allocation flag is a first flag, and, when the meta data are not allocated to the meta cache, the cache allocation flag is a second flag, which is different from the first flag.

2. The storage device of claim 1, wherein the storage controller is further configured to:
    send a meta update request related to the meta data to the meta cache, and
    determine whether the meta data are allocated to the meta cache in response to a meta response corresponding to the meta update request.

3. The storage device of claim 2,
    wherein upon determining that the meta data are allocated to the meta cache, the storage controller is further configured to generate the journal data including the first flag, or
    wherein upon determining that the meta data are not allocated to the meta cache, the storage controller is further configured to generate the journal data including the second flag.

4. The storage device of claim 3,
    wherein upon starting up the storage device following a power event, the storage controller is further configured to perform a journal replay operation,
    wherein, during the journal replay operation, the storage controller is configured to restore backup data of the meta data stored in the non-volatile memory device to the meta cache when the journal data includes the first flag, or restore backup data of the meta data stored in the non-volatile memory device to the meta buffer when the journal data includes the second flag.

5. The storage device of claim 1, wherein the storage controller is further configured to:
    send a meta update request associated with the meta data to the meta cache, and
    determine whether the meta data are allocated to the meta cache in response to a response time corresponding to the meta update request.

6. The storage device of claim 5, wherein the storage controller is configured to determine that the meta data are allocated to the meta cache when the response time is less than or equal to a reference time, or determine that the meta data are not allocated to the meta cache when the response time is greater than the reference time.

7. The storage device of claim 1, wherein the storage controller is further configured to receive meta management information, identify locality information in relation to the meta management information, and determine whether the meta data are allocated to the meta cache in response to the locality information.

8. The storage device of claim 1,
    wherein the storage controller includes a journal buffer configured to temporarily store the journal data, and
    wherein the storage controller is further configured to move the journal data from the journal buffer to the non-volatile memory device in response to a specified condition.

9. The storage device of claim 8, wherein the specified condition is a determination that the journal buffer is full.

10. The storage device of claim 8, wherein the specified condition is a sudden change in an operative state of the storage device.

11. The storage device of claim 1, wherein the journal data include:
    an opcode including information characterizing the journal data;
    an address code including index information associated with the meta data;
    meta data information including information characterizing the meta data; and
    the cache allocation flag indicating whether the meta data are allocated to the meta cache.

12. An operating method of a storage device, the method comprising:
    identifying locality information related to meta data, upon updating of the meta data;
    determining, in response to the locality information, whether the meta data are allocated to a meta cache;
    generating journal data including a cache allocation flag related to the meta data, wherein when the meta data are allocated to the meta cache, the cache allocation flag is a first flag or when the meta data are not allocated to the meta cache, the cache allocation flag is a second flag, which is different from the first flag;
    storing the journal data to a journal buffer; and
    moving, in response to a specified condition, the journal data from the journal buffer to a non-volatile memory device.

13. The method of claim 12,
wherein the identifying of the locality information includes sending a meta update request related to the meta data from a meta manager to the meta cache, and sending a meta response corresponding to the meta update request from the meta cache to the meta manager,
wherein the determining of whether the meta data are allocated to the meta cache includes determining whether the meta data are allocated to the meta cache in response to the meta response, and
wherein the meta response includes cache allocation information indicating whether the meta data are allocated to the meta cache.

14. The method of claim 13, wherein the generating of the journal data includes generating the journal data to include the first flag, upon determining that the meta data are allocated to the meta cache using the meta manager, or generating the journal data to include the second flag, upon determining that the meta data are not allocated to the meta cache using the meta manager.

15. The method of claim 12, wherein the identifying of the locality information includes:
sending a meta update request associated with the meta data from a meta manager to the meta cache; and
measuring a response time related to a meta response corresponding to the meta update request using the meta manager.

16. The method of claim 15, wherein the determining of whether the meta data are allocated to a meta cache in response to the locality information includes:
determining, when the response time is less than or equal to a reference time, that the meta data are allocated to the meta cache, or
determining, when the response time is greater than the reference time, that the meta data are not allocated to the meta cache.

17. The method of claim 12, wherein the identifying of the locality information includes:
receiving meta management information from a processing unit using a meta manager; and
identifying the locality information from the meta management information using the meta manager,
wherein the meta management information includes at least one of management information associated with the non-volatile memory device and update information associated with the meta data.

18. The method of claim 17,
wherein the determining that the meta data are allocated to the meta cache includes determining that a locality of the meta data is greater than or equal to a reference threshold, and
wherein the determining that the meta data are not allocated to the meta cache includes determining that the locality of the meta data is less than the reference threshold.

19. The method of claim 12, wherein the specified condition is one of determining that the journal buffer is full and detecting a sudden change in an operative state of the storage device.

20. An operating method of a storage device, the method comprising:
loading journal data from a non-volatile memory device;
identifying a cache allocation flag included in the journal data; and
restoring meta data corresponding to the journal data to a storage controller in response to the cache allocation flag,
wherein the cache allocation flag is a first flag when the meta data are allocated to a meta cache of the storage controller, and
the cache allocation flag is a second flag when the meta data are stored to a meta buffer of the storage controller.

* * * * *